United States Patent
Topf et al.

(10) Patent No.: US 9,016,530 B2
(45) Date of Patent: Apr. 28, 2015

(54) CONTROL VALVE HAVING A DISPOSABLE VALVE BODY

(71) Applicant: The Boeing Company, Chicago, IL (US)

(72) Inventors: Richard Philip Topf, Orange, CA (US); Martin Hanna Guirguis, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 13/886,535

(22) Filed: May 3, 2013

(65) Prior Publication Data

US 2014/0326760 A1 Nov. 6, 2014

(51) Int. Cl.
| | | |
|---|---|---|
| B67D 3/00 | (2006.01) |
| B05C 5/02 | (2006.01) |
| B05B 1/30 | (2006.01) |
| F16K 23/00 | (2006.01) |
| F16K 31/00 | (2006.01) |

(52) U.S. Cl.
CPC ............ *B05C 5/0225* (2013.01); *B05B 1/3046* (2013.01); *B05B 1/3073* (2013.01); *F16K 23/00* (2013.01); *F16K 31/00* (2013.01)

(58) Field of Classification Search
USPC ............ 222/1, 340, 389, 559, 571, 504, 631, 222/630; 239/290, 525, 526, 528; 137/15.18, 605, 1; 251/318
See application file for complete search history.

(56) References Cited

U.S. PATENT DOCUMENTS

| | | | |
|---|---|---|---|
| 2,126,999 A | 8/1938 | Mitchell | |
| 2,227,792 A | 1/1941 | Norton, Jr. | |
| 2,609,974 A | 9/1952 | Brous | |
| 2,824,443 A | 2/1958 | Ames | |
| 3,661,679 A | 5/1972 | Law | |
| 3,746,253 A * | 7/1973 | Walberg ...................... 239/705 |

(Continued)

FOREIGN PATENT DOCUMENTS

| | | |
|---|---|---|
| CN | 101858456 B | 12/2012 |
| DE | 102004027789 A1 | 2/2005 |

(Continued)

OTHER PUBLICATIONS

"Dispense Valves for Adhesives, Sealants, Lubricants, Epoxy, Polyurethane, Silicone & More," Kiss, No-Drip, Snuf-Bak, Tip-Seal,Manual, Metering, and High Flow valve part specifications, Sealant Equipment and Engineering, Inc., 12 pages, accessed Apr. 9, 2013, http://www.sealantequipment.com/dispensevalves-1part.htm.

(Continued)

*Primary Examiner* — Frederick C Nicolas
*Assistant Examiner* — Bob Zadeh
(74) *Attorney, Agent, or Firm* — Yee & Associates, P.C.

(57) ABSTRACT

A method and apparatus for controlling a flow of a fluid through a valve. In one illustrative embodiment, an apparatus comprises an elongate member, an actuation device, and a valve body. The actuation device is configured to move the elongate member, which may be associated with the actuation device, between an open position and a closed position. The valve body is configured for attachment to the actuation device such that the elongate member is positioned within the valve body. Fluid that flows into the valve body from a fluid source is allowed to flow out of the valve body when the elongate member is in the open position.

22 Claims, 14 Drawing Sheets

(56) References Cited

U.S. PATENT DOCUMENTS

| | | | |
|---|---|---|---|
| 3,888,421 A | 6/1975 | Chow | |
| 4,570,834 A | 2/1986 | Ward | |
| 4,698,005 A | 10/1987 | Kikuchi et al. | |
| 4,925,061 A | 5/1990 | Jeromson, Jr. et al. | |
| 4,932,094 A | 6/1990 | McCowin | |
| 4,948,016 A | 8/1990 | Summons et al. | |
| 4,989,792 A | 2/1991 | Claassen | |
| 5,017,113 A | 5/1991 | Heaton et al. | |
| 5,271,521 A | 12/1993 | Noss et al. | |
| 5,271,537 A | 12/1993 | Johnson | |
| 5,319,568 A | 6/1994 | Bezaire | |
| 5,346,380 A | 9/1994 | Ables | |
| 5,462,199 A | 10/1995 | Lenhardt | |
| 5,480,487 A | 1/1996 | Figini et al. | |
| 5,571,538 A | 11/1996 | Cloud | |
| 5,615,804 A | 4/1997 | Brown | |
| 5,803,367 A * | 9/1998 | Heard et al. | 239/296 |
| 5,906,296 A * | 5/1999 | Martindale et al. | 222/108 |
| 5,920,974 A | 7/1999 | Bullen | |
| 5,976,631 A * | 11/1999 | Ramachandran | 427/207.1 |
| 5,992,686 A | 11/1999 | Cline et al. | |
| 5,995,909 A | 11/1999 | Bretmersky et al. | |
| 6,001,181 A | 12/1999 | Bullen | |
| 6,082,587 A * | 7/2000 | Martindale et al. | 222/108 |
| 6,213,354 B1 | 4/2001 | Kay | |
| 6,698,617 B1 | 3/2004 | Szymanski | |
| 6,739,483 B2 | 5/2004 | White et al. | |
| 6,935,541 B1 | 8/2005 | Campbell et al. | |
| 6,942,736 B2 | 9/2005 | Chinander et al. | |
| 6,986,472 B2 * | 1/2006 | Gordon | 239/225.1 |
| 7,032,839 B2 * | 4/2006 | Blette et al. | 239/302 |
| 7,172,096 B2 | 2/2007 | O'Dougherty | |
| 7,275,663 B2 | 10/2007 | Campbell et al. | |
| 7,578,416 B2 | 8/2009 | Underwood | |
| 7,592,033 B2 | 9/2009 | Buckley et al. | |
| 7,815,132 B2 * | 10/2010 | Baltz | 239/690 |
| 7,922,107 B2 * | 4/2011 | Fox | 239/600 |
| 8,181,822 B2 | 5/2012 | Doelman et al. | |
| 8,453,876 B2 * | 6/2013 | Miller | 222/1 |
| 8,534,499 B2 | 9/2013 | Williams et al. | |
| 2005/0145724 A1 | 7/2005 | Blette et al. | |
| 2010/0260531 A1 | 10/2010 | Rademacher | |
| 2011/0297175 A1 | 12/2011 | Pires et al. | |
| 2012/0273115 A1 | 11/2012 | Suzuki et al. | |

FOREIGN PATENT DOCUMENTS

| | | |
|---|---|---|
| DE | 202005005619 U1 | 2/2006 |
| DE | 102004042211 A1 | 3/2006 |
| DE | 102008010169 A1 | 9/2009 |
| DE | 202007019244 U1 | 8/2011 |
| DE | 102010030375 A1 | 12/2011 |
| EP | 0181483A1 A1 | 5/1986 |
| EP | 1245348 A1 | 10/2002 |
| EP | 1425107 B1 | 5/2006 |
| EP | 2277631A1 A1 | 1/2011 |
| EP | 2839885 A1 | 2/2015 |
| FR | 2508350 A1 | 12/1982 |
| GB | 2282554 A | 4/1995 |
| GB | 2481299 A | 12/2011 |
| JP | 2002059049 A | 2/2002 |
| WO | WO0067915 A1 | 11/2000 |
| WO | WO2005012845 A2 | 2/2005 |
| WO | WO2010093494 A1 | 8/2010 |
| WO | WO2011108358 A2 | 9/2011 |
| WO | WO2013112178 A1 | 8/2013 |

OTHER PUBLICATIONS

"No-Drip Air Operated Fluid Dispense Valve," 2100-108 Series part specifications, Sealant Equipment and Engineering, Inc., 2 pages, accessed Apr. 9, 2013, http://www.sealantequipment.com/pdf/DispenseValves/2100-108%20No-Drip%20Valves.pdf.

"Compliance Nozzle," 1208-178-000 part specifications, Sealant Equipment and Engineering, Inc., 2 pages, accessed Apr. 9, 2013, http://sealantequipment.com/pdf/DispenseValves/1208-178%20Compliance%20Nozzle.pdf.

Davancens et al., "Robotic Sealant and End Effector," U.S. Appl. No. 12/842,247, filed Jul. 23, 2010, 41 pages.

Tomuta et al., "Fluid Application Device," U.S. Appl. No. 13/769,569, filed Feb. 18, 2013, 63 pages.

Topf et al., "Feedback Control System for Performing Fluid Dispensing Operations," U.S. Appl. No. 13/951,817, filed Jul. 26, 2013, 51 pages.

Tomuta et al., "Method and Apparatus for Exchanging Nozzles and Tips for a Fluid Dispensing System," U.S. Appl. No. 13/973,528, filed Aug. 22, 2013, 64 pages.

Tomuta et al., "Fluid Application Device," U.S. Appl. No. 14/016,846, filed Sep. 3, 2013, 59 pages.

International Search Report and Written Opinion, dated Apr. 4, 2014, regarding Application No. PCT/US2014/011879, 9 pages.

International Search Report and Written Opinion, dated Jun. 4, 2014, regarding Application No. PCT/US2014/033738, 9 pages.

Office Action, dated Nov. 28, 2014, regarding U.S. Appl. No. 13/951,817, 17 pages.

International Search Report and Written Opinion, dated Oct. 7, 2014, regarding Application No. PCT/US2014/040989, 10 pages.

Extended European Search Report, dated Oct. 15, 2014, regarding Application No. 14175644.5, 6 pages.

International Search Report and Written Opinion, dated Oct. 15, 2014, regarding Application No. PCT/US2014/045018, 9 pages.

Extended European Search Report, dated Jan. 8, 2015, regarding Application No. EP14180160.5, 6 pages.

* cited by examiner

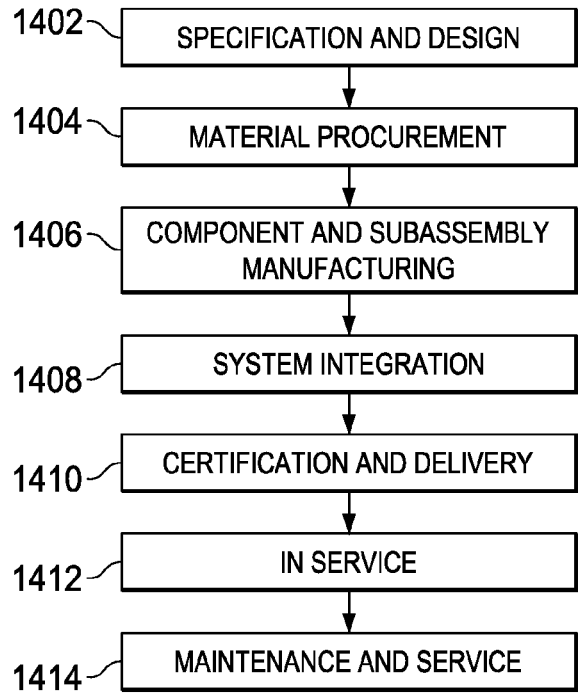
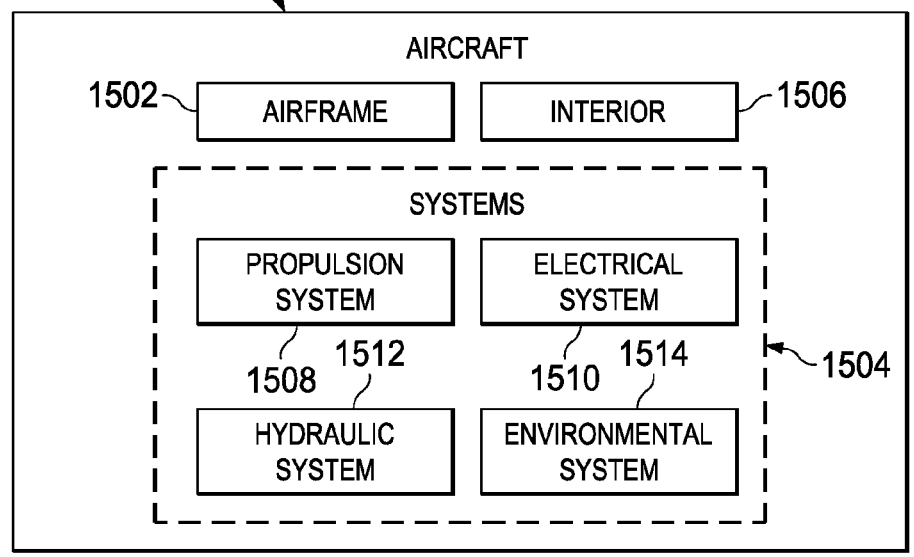

CONTROL VALVE HAVING A DISPOSABLE VALVE BODY

BACKGROUND INFORMATION

1. Field

The present disclosure relates generally to fluid dispensing systems and, in particular, to a control valve for a fluid dispensing system. Still more particularly, the present disclosure relates to an apparatus and method for controlling a flow of fluid through a control valve having a disposable housing.

2. Background

Fluid dispensing systems may be used to dispense fluids such as, for example, without limitation, sealant, adhesive, water, oil, and other types of fluids. In one illustrative example, a fluid dispensing system may be used to dispense sealant over an interface between two components. The interface may be, for example, without limitation, the interface between a first panel and a second panel, the interface between a fastener element and a surface, a joint, a seam, or some other type of interface.

Some currently available fluid dispensing systems may route a fluid, such as sealant, to a flow control valve that is located upstream of a separate dispensing tip, or nozzle. Oftentimes, this dispensing tip may be disposable. Once fluid dispensing operations have been completed, the fluid dispensing system may need to be cleaned or purged of the fluid. In particular, the internal portion of the flow control valve may need to be cleaned. However, with the configurations of some currently available flow control valves, cleaning these flow control valves may be more difficult and/or time-consuming than desired.

Further, in some cases, the dispensing of a fluid may be halted periodically to rework the shape of the fluid that has been deposited over an interface. In particular, the fluid that has been deposited may need to be reworked to create a fluid surface resistance to inconsistencies. For example, without limitation, a separate, disposable tool may be used to rework the shape of the deposition of the fluid into a shape having a reduced likelihood of peeling away from the interface over time or separating from the surface of the components joined at the interface. The reworking of the fluid surface may include fairing the fluid surface. As used herein, "fairing" may mean smoothing, removing a portion of material from, and/or rubbing.

When the fluid is a fluid having a higher viscosity, such as a sealant, halting the dispensing of the fluid for more than a known working time of the fluid may cause the fluid within the flow control valve and/or within other components of the fluid dispensing system to be unworkable. In other words, the fluid may not flow. Consequently, the fluid dispensing system may need to be disassembled and cleaned prior to reuse. This process may require more time and/or effort than desired. Therefore, it would be desirable to have a method and apparatus that take into account at least some of the issues discussed above, as well as other possible issues.

SUMMARY

In one illustrative embodiment, an apparatus comprises an elongate member, an actuation device, and a valve body. The actuation device is configured to move the elongate member, which may be associated with the actuation device, between an open position and a closed position. The valve body is configured for attachment to the actuation device such that the elongate member is positioned within the valve body. Fluid that flows into the valve body from a fluid source is allowed to flow out of the valve body when the elongate member is in the open position.

In another illustrative embodiment, a fluid dispensing system comprises a fluid source, an elongate member, an actuation device, a disposable valve body, a first element associated with the disposable valve body, and a second element associated with the disposable valve body. The fluid source holds a fluid having a viscosity within a selected range. The actuation device is configured to move the elongate member, which may be associated with the actuation device, linearly in a direction along an axis between an open position and a closed position. The disposable valve body is configured for attachment to the actuation device such that the elongate member is positioned within the disposable valve body. The first element is configured for attachment to the fluid source. Fluid is configured to flow from the fluid source into the disposable valve body through the first element and out of the disposable valve body through the second element when the elongate member is in the open position. Removing the disposable valve body allows access to the elongate member such that the elongate member can be cleaned.

In yet another illustrative embodiment, a method for controlling a flow of fluid through a valve is provided. The fluid is received from a fluid source within a valve body of the valve. The elongate member positioned within the valve body is moved between an open position and a closed position using the actuation device associated with the elongate member to control the flow of the fluid out of the valve body.

In still yet another illustrative embodiment, a method for dispensing fluid onto a surface is provided. A valve body is attached to an actuation device such that an elongate member associated with the actuation device is positioned within the valve body. A fluid source is attached to a first element associated with the valve body. The fluid is received from the fluid source within the valve body through the first element. The elongate member is moved into an open position using the actuation device to allow the fluid flowing into the valve body through the first element to flow out of the valve body through a second element. The fluid is dispensed through a nozzle associated with the valve body onto the surface. The nozzle is formed by at least a portion of the second element associated with the valve body. The elongate member is moved into a closed position using the actuation device to stop the fluid flowing into the valve body through the first element from flowing out of the valve body through the second element. The valve body is removed from the actuation device to allow access to the elongate member such that the elongate member can be cleaned.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of an aircraft manufacturing and service method in the form of a flowchart in accordance with an illustrative embodiment; and FIG. 15 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a fluid dispensing system having a flow control valve that can be easily cleaned. Further, the illustrative embodiments recognize and take into account that it may be desirable to have a fluid dispensing system capable of dispensing fluid with a greater precision as compared to some currently available fluid dispensing systems.

Thus, the illustrative embodiments provide a fluid dispensing system having a control valve with a disposable valve body. This disposable valve body may be removed from the control valve to allow access to the internal wetted portions of the control valve. The disposable valve body may then be discarded after use allowing for the inner portion of the control valve to be accessible and cleaned with ease. A different disposable valve body may then be attached to the control valve to enable optimum performance of the control valve and improved dispensing of the fluid. This new disposable body may have a same or different configuration compared to the first disposable body. In one illustrative embodiment, the disposable housing may be configured such that a portion of the disposable housing forms a nozzle through which the fluid may be dispensed.

Figure 1:
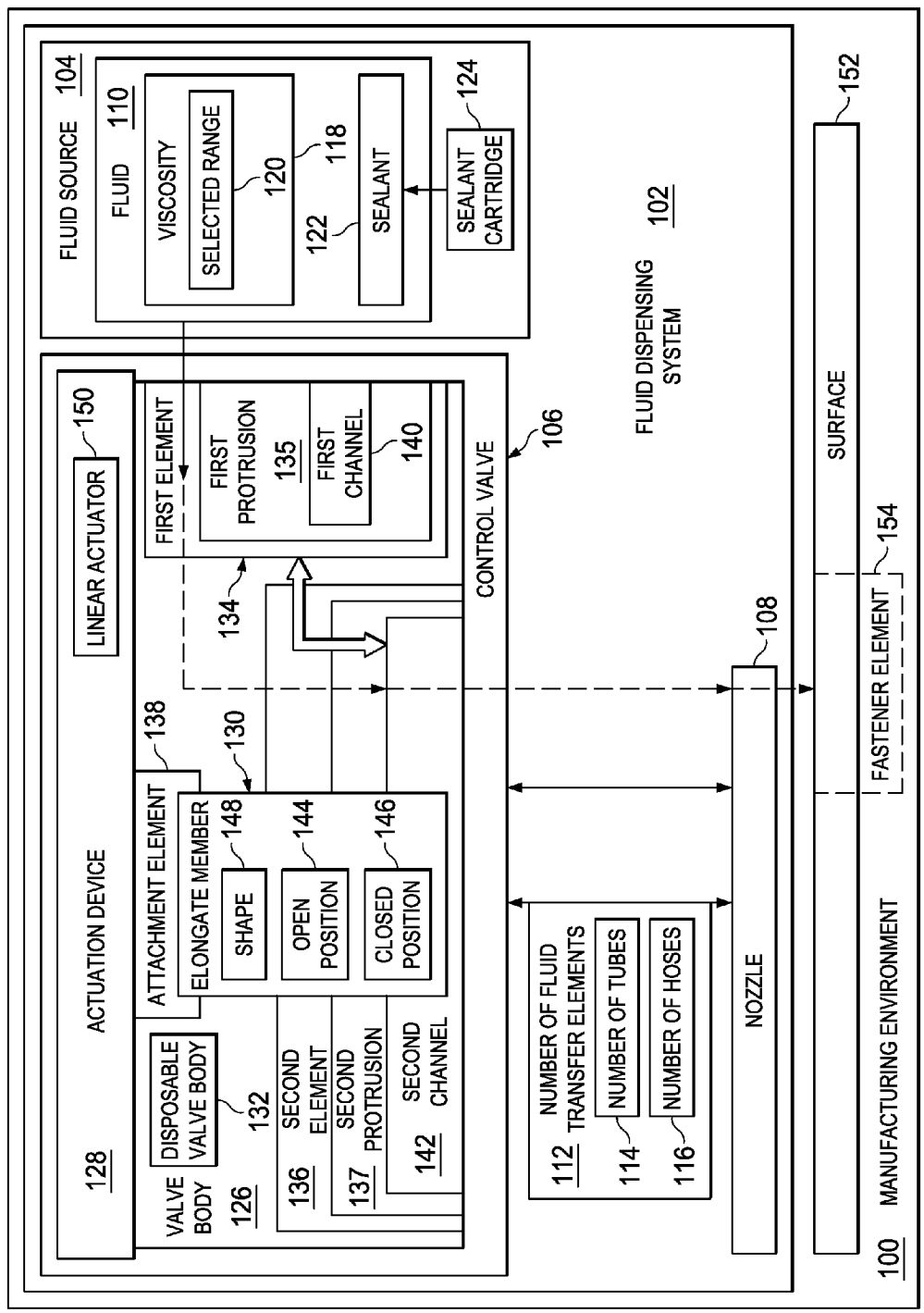
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 may be an example of an environment in which fluid dispensing system 102 may be used. As depicted, fluid dispensing system 102 may include fluid source 104, control valve 106, and nozzle 108.

Fluid source 104 may hold fluid 110. Control valve 106 may receive fluid 110 from fluid source 104 and allow fluid 110 to flow to nozzle 108. In particular, control valve 106 may control the flow of fluid 110 to nozzle 108. Nozzle 108 may control the portion of fluid dispensing system 102 through which fluid 110 is dispensed. In other words, fluid 110 may exit fluid dispensing system 102 through nozzle 108.

In some illustrative examples, nozzle 108 may be formed by a portion of control valve 106. In this manner, nozzle 108 may be considered part of control valve 106 in these examples. In other illustrative examples, number of fluid transfer elements 112 may be used to connect control valve 106 to nozzle 108. In particular, fluid 110 may flow through control valve 106 to nozzle 108 through number of fluid transfer elements 112.

As used herein, a "number of" items may be one or more items. In this manner, number of fluid transfer elements 112 may be one or more fluid transfer elements. Further, as used herein, a "fluid transfer element," such as one of number of fluid transfer elements 112 may be any element configured to allow fluid 110 to flow through a channel located within the element. In one illustrative example, number of fluid transfer elements 112 may take the form of number of tubes 114. In another illustrative example, number of fluid transfer elements 112 may take the form of number of hoses 116.

Fluid 110, in this illustrative example, may have viscosity 118 within selected range 120. Viscosity 118 may be a measure of the resistance of fluid 110 to gradual deformation by shear stress or tensile stress. In particular, viscosity 118 may indicate the resistance of fluid 110 to flow. A fluid having a higher viscosity may be more resistant to flow than a fluid having a lower viscosity. Selected range 120 may be the range of viscosities between about 1 centipoise to about 20 centipoise. Of course, some other range may be selected in other illustrative examples.

In one illustrative example, fluid 110 may take the form of sealant 122 and fluid source 104 may take the form of sealant cartridge 124 configured to hold sealant 122. Sealant 122 may have viscosity 118 within selected range 120.

As depicted, control valve 106 may include valve body 126, actuation device 128, elongate member 130, first element 134, and second element 136. Valve body 126 may be configured for attachment to both actuation device 128 and fluid source 104. Valve body 126 may have attachment element 138 associated with valve body 126. Attachment element 138 may be configured to allow valve body 126 to be attached to actuation device 128.

As used herein, when one component is "associated" with another component, the association is a physical association in the depicted examples. For example, without limitation, a first component, such as attachment element 138, may be considered to be associated with a second component, such as valve body 126, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, elongate member 130 may be associated with actuation device 128. As used herein, elongate member 130 may be an object that is long with respect to the width or diameter of the object. The object may be extended along a longitudinal axis through the object. In some cases, elongate member 130 may be referred to as an elongated member. Valve body 126 may be attached to actuation device 128 in a manner such that elongate member 130 extends within valve body 126. In other words, valve body 126 may be attached to actuation device 128 such that elongate member 130 is positioned within valve body 126.

In this illustrative example, valve body 126 may take the form of disposable valve body 132. In other words, valve body 126 may be disposable. Valve body 126 may be attached to actuation device 128 and fluid source 104 for use, then removed from actuation device 128 and fluid source 104 and discarded after use.

Valve body 126 may be attached to fluid source 104 using first element 134. First element 134 may be associated with valve body 126. In one illustrative example, first element 134 may take the form of first protrusion 135 extending from valve body 126. In this example, first protrusion 135 may have threads configured to engage corresponding threads on fluid source 104 to attach valve body 126 to fluid source 104.

First element 134 may have first channel 140. First channel 140 may be configured to receive fluid 110 from fluid source 104. In this manner, fluid 110 may flow into valve body 126 through first channel 140 within first element 134.

Further, second element 136 may be associated with valve body 126. In one illustrative example, second element 136 may take the form of second protrusion 137 extending from valve body 126. In some cases, at least a portion of second element 136 may form nozzle 108. In other examples, second element 136 may be configured for association with nozzle 108 through number of fluid transfer elements 112. For example, without limitation, second protrusion 137 may have threads configured to engage corresponding threads on one of number of fluid transfer elements 112 to attach valve body 126 to number of fluid transfer elements 112.

Second element 136 may have second channel 142. First channel 140 of first element 134 may open into second channel 142 of second element 136 such that fluid 110 may flow from first channel 140 into second channel 142. Fluid 110 may flow out of valve body 126 through second channel 142.

Actuation device 128 may be used to control the flow of fluid 110 through first channel 140 into second channel 142. In particular, actuation device 128 may be used to control whether first channel 140 opens up into second channel 142 or whether second channel 142 is closed off from first channel 140.

In this illustrative example, elongate member 130 may extend through valve body 126 and may be moved between open position 144 and closed position 146 by actuation device 128. When elongate member 130 is moved into open position 144, fluid 110 may be allowed to flow through second channel 142 from first channel 140. However, when elongate member 130 is moved into closed position 146, fluid 110 may be stopped from flowing through second channel 142 from first channel 140.

In one illustrative example, elongate member 130 may have shape 148 configured such that moving elongate member 130 between open position 144 and closed position 146 controls the flow of fluid 110 into second channel 142. In some cases, shape 148 may be configured such that the diameter of elongate member 130 changes along the length of elongate member 130. For example, without limitation, shape 148 may be configured such that a middle portion of elongate member 130 has a smaller diameter than the end portions of elongate member 130.

Actuation device 128 may take a number of different forms, depending on the implementation. In one illustrative example, actuation device 128 may take the form of linear actuator 150. Linear actuator 150 may be configured to linearly move elongate member 130 in a direction along an axis to move elongate member 130 between open position 144 and closed position 146. Linear actuator 150 may be implemented using, for example, without limitation, an electrical actuator, an electromechanical actuator, a mechanical actuator, a pneumatic actuator, a hydraulic actuator, a piston device, and/or some other type of actuation device.

When fluid 110 is allowed to flow through second channel 142, fluid 110 may be dispensed from fluid dispensing system 102 through nozzle 108 onto surface 152. In other words, fluid 110 may exit fluid dispensing system 102 through nozzle 108.

Elongate member 130 may be moved to open position 144 when nozzle 108 fully covers fastener element 154 to allow fluid 110 to fully cover fastener element 154. Elongate member 130 may then be moved to closed position 146 and nozzle 108 removed from fastener element 154.

Fastener element 154 may be any type of fastener element. Fastener element 154 may take the form of, for example, without limitation, a nut, a screw, a portion of a fastener, a bolt, a bolt head, a hinge, a bracket, or some other type of fastener element.

After use of fluid dispensing system 102, valve body 126 may be removed from actuation device 128 to provide access to elongate member 130. Further, valve body 126 may be removed from fluid source 104. Valve body 126 may be configured such that only the portion of elongate member 130 exposed within valve body 126 is wetted when fluid 110 flows into and out of valve body 126. Valve body 126 may be removed and discarded after use such that the wetted portion of elongate member 130 may be cleaned with ease. In this manner, different types of valve bodies may be used with the same fluid source 104, actuation device 128, and elongate member 130.

This type of configuration for control valve 106 and valve body 126, in particular, may reduce the overall time needed to dispense fluid 110 during manufacturing operations, assembly operations, and/or other types of operations that may be performed within manufacturing environment 100. Further, having disposable valve body 132 may allow the cleaning of control valve 106 to be performed more quickly and easily as compared to cleaning the interior of a control valve to which access is limited.

The illustration of manufacturing environment 100 and fluid dispensing system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, without limitation, number of fluid transfer elements 112 may not be used to connect second element 136 to nozzle 108. In some cases, nozzle 108 may be a separate member that may be directly connected to second element 136.

In another illustrative example, first element 134 may allow attachment of valve body 126 to fluid source 104 and another fluid source (not shown) such that fluid 110 held within fluid source 104 and the fluid (not shown) within the other fluid source (not shown) may both be received and mixed within first channel 140.

Figure 2:
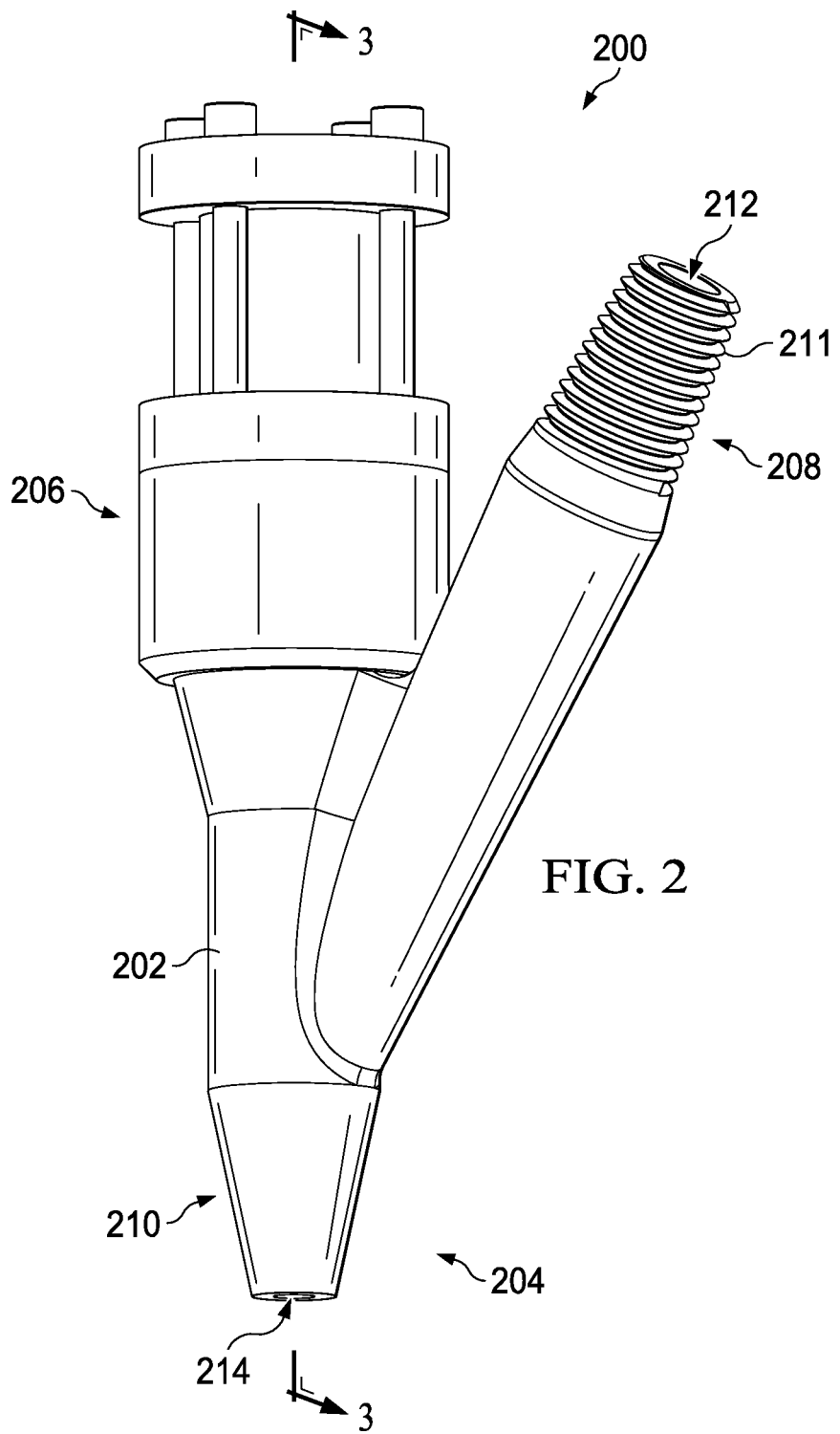
FIG. 2 is an illustration of an isometric view of a control valve in accordance with an illustrative embodiment.

With reference now to FIG. 2, an illustration of an isometric view of a control valve is depicted in accordance with an illustrative embodiment. In FIG. 2, control valve 200 may be an example of one implementation for control valve 106 in FIG. 1. As depicted, control valve 200 may include valve body 202, nozzle 204, and actuation device 206. Valve body 202, nozzle 204, and actuation device 206 may be examples of implementations for valve body 126, nozzle 108, and actuation device 128, respectively, in FIG. 1.

In this illustrative example, valve body 202 includes first element 208 and second element 210. First element 208 and second element 210 may be examples of implementations for first element 134 and second element 136, respectively, in FIG. 1. First element 208 may have threads 211 configured to engage corresponding threads (not shown) on a fluid source (not shown) to attach valve body 202 to that fluid source. Further, first element 208 may have first channel 212 configured to receive a fluid (not shown) from the fluid source.

The fluid that flows into valve body 202 through first element 208 may be configured to flow out of valve body 202 through second element 210. In particular, the fluid that flows through first channel 212 of first element 208 may flow through second channel 214 of second element 210. Actuation device 206 may be used to control this flow of fluid. First channel 212 and second channel 214 may be examples of implementations for first channel 140 and second channel 142, respectively, in FIG. 1.

In this illustrative example, at least a portion of second element 210 may form nozzle 204. The fluid may be dispensed through nozzle 204 onto some type of surface.

Figure 3:
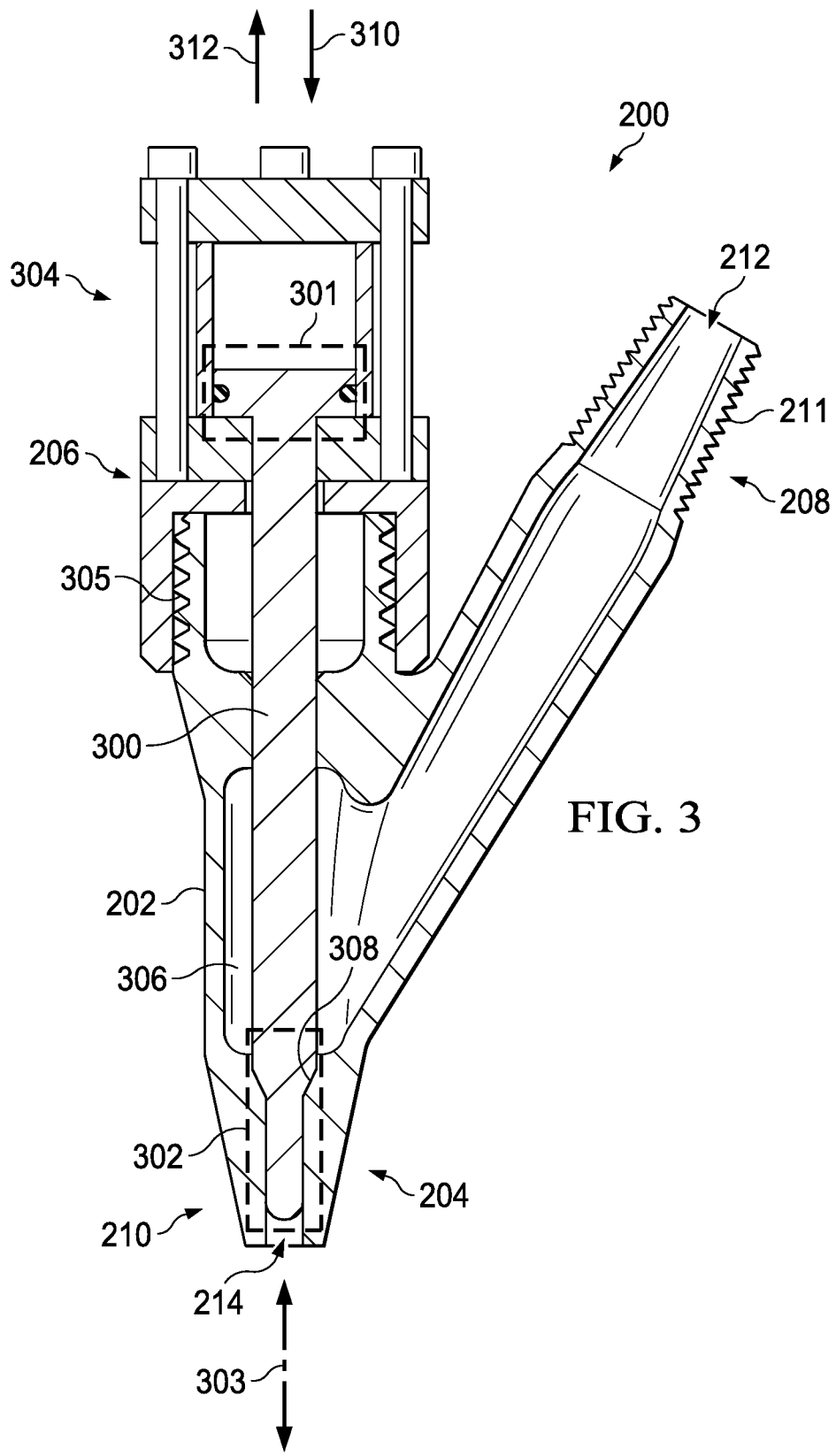
FIG. 3 is an illustration of a cross-sectional view of a control valve in accordance with an illustrative embodiment.

With reference now to FIG. 3, an illustration of a cross-sectional view of control valve 200 from FIG. 2 is depicted in accordance with an illustrative embodiment. In this illustrative example, a cross-sectional view of control valve 200 from FIG. 2 is depicted taken along lines 3-3 in FIG. 2.

As depicted, control valve 200 may also include elongate member 300. Elongate member 300 may be an example of one implementation for elongate member 130 in FIG. 1. Elongate member 300 may have flanged portion 301 and plug portion 302.

Flanged portion 301 may be used to associate elongate member 300 with actuation device 206. Actuation device 206 may be configured to move elongate member 300 linearly in a direction along axis 303. In this illustrative example, actuation device 206 may take the form of pneumatic actuator 304. Valve body 202 may have attachment element 305 configured to attach to pneumatic actuator 304. Attachment element 305 may be an example of one implementation for attachment element 138 in FIG. 1.

Plug portion 302 may be used to plug second channel 214. In particular, plug portion 302 may be used to stop fluid flowing within first channel 212 from flowing into second channel 214. As depicted, valve body 202 may have hollow portion 306. Hollow portion 306 may connect first channel 212 to second channel 214. In other words, fluid flowing through first channel 212 may flow into second channel 214 through hollow portion 306 of valve body 202.

Opening 308 may connect hollow portion 306 to second channel 214. As depicted, opening 308 may have a smaller diameter than hollow portion 306. Elongate member 300 may be sized such that fluid may be allowed to flow around elongate member 300 within hollow portion 306. Further, fluid may be allowed to flow into second channel 214 when elongate member 300 is not positioned within second channel 214.

However, elongate member 300 may be moved in the direction of arrow 310 into second channel 214 to plug second channel 214. When elongate member 300 is at least partially positioned within second channel 214, fluid within hollow portion 306 may not be allowed to pass through opening 308 into second channel 214. Consequently, fluid may be prevented from flowing out of valve body 202 through second channel 214 of second element 210. In other words, no fluid may be dispensed through nozzle 204.

Elongate member 300 may then be moved in the direction of arrow 312 out of second channel 214 to allow fluid within hollow portion 306 to pass through opening 308 into second channel 214. In this manner, fluid may be dispensed through nozzle 204.

Figure 4:
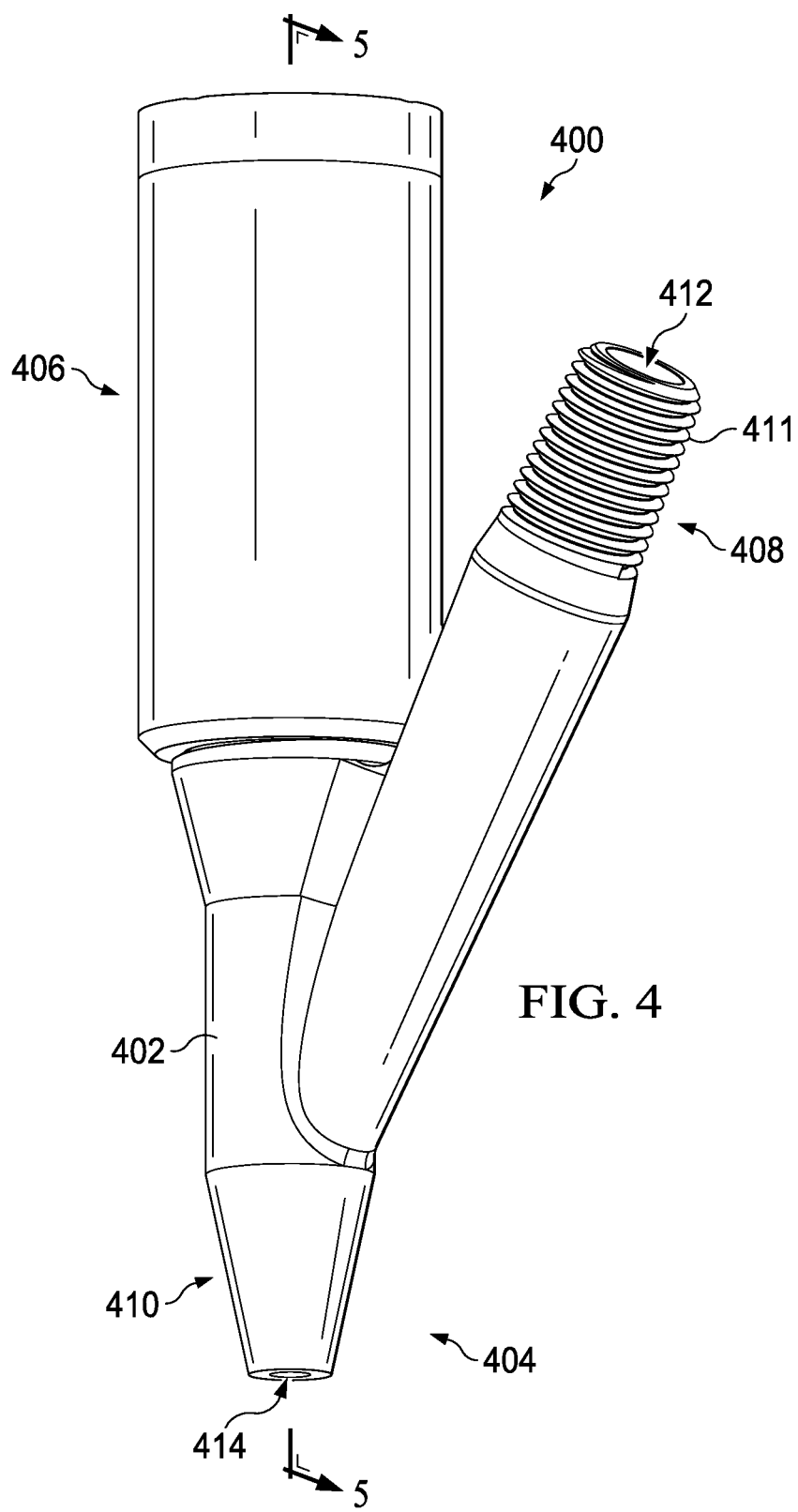
FIG. 4 is another illustration of an isometric view of a control valve in accordance with an illustrative embodiment.

With reference now to FIG. 4, another illustration of an isometric view of a control valve is depicted in accordance with an illustrative embodiment. In FIG. 4, control valve 400 may be an example of one implementation for control valve 106 in FIG. 1. As depicted, control valve 400 may include valve body 402, nozzle 404, and actuation device 406. Valve body 402, nozzle 404, and actuation device 406 may be examples of implementations for valve body 126, nozzle 108, and actuation device 128, respectively, in FIG. 1.

In this illustrative example, valve body 402 includes first element 408 and second element 410. First element 408 and second element 410 may be examples of implementations for first element 134 and second element 136, respectively in FIG. 1. First element 408 may have threads 411 configured to engage corresponding threads (not shown) on a fluid source (not shown) to attach valve body 402 to that fluid source. Further, first element 408 may have first channel 412 configured to receive a fluid (not shown) from that fluid source.

The fluid that flows into valve body 402 through first element 408 may be configured to flow out of valve body 402 through second element 410. In particular, the fluid that flows through first channel 412 of first element 408 may flow through second channel 414 of second element 410. Actuation device 406 may be used to control this flow of fluid. First channel 412 and second channel 414 may be examples of implementations for first channel 140 and second channel 142, respectively, in FIG. 1.

In this illustrative example, at least a portion of second element 410 may form nozzle 404. The fluid may be dispensed through nozzle 404 onto some type of surface.

Figure 5:
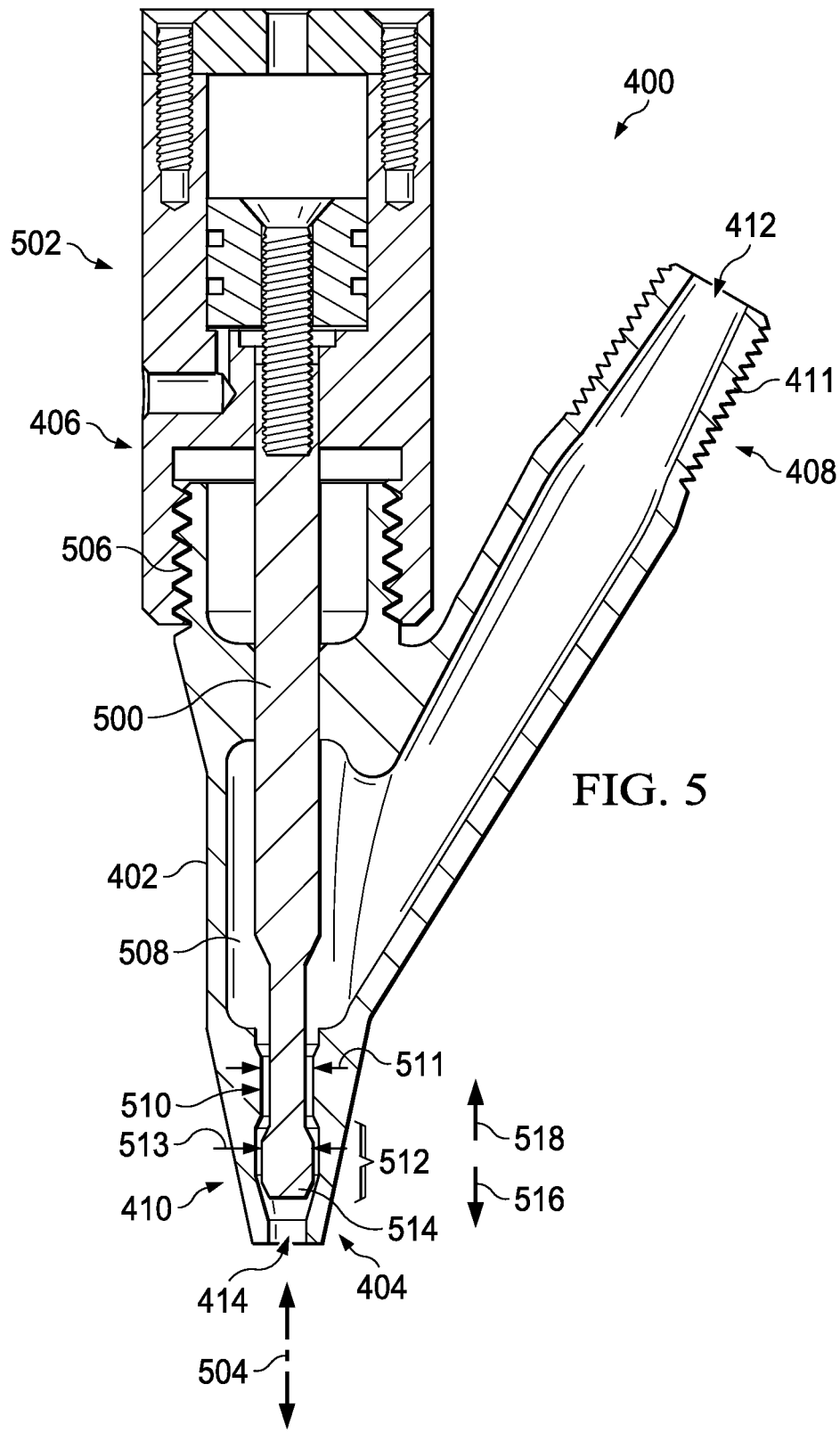
FIG. 5 is an illustration of a cross-sectional view of a control valve in accordance with an illustrative embodiment.

Turning now to FIG. 5, an illustration of a cross-sectional view of control valve 400 from FIG. 4 is depicted in accordance with an illustrative embodiment. In this illustrative example, a cross-sectional view of control valve 400 from FIG. 4 is depicted taken along lines 5-5 in FIG. 4.

As depicted, control valve 400 may also include elongate member 500. Elongate member 500 may be an example of one implementation for elongate member 130 in FIG. 1. Elongate member 500 may associated with actuation device 406. In this illustrative example, actuation device 406 may take the form of piston device 502. Piston device 502 may be configured to move elongate member 500 linearly in a direction along axis 504.

In this illustrative example, valve body 402 may have attachment element 506 used to attach valve body 402 to piston device 502. Attachment element 506 may be an example of one implementation for attachment element 138 in FIG. 1.

As depicted, valve body 402 may have hollow portion 508. Hollow portion 508 may connect first channel 412 to second channel 414. In other words, fluid flowing through first channel 412 may flow into second channel 414 through hollow portion 508 of valve body 402.

Further, hollow portion 508 may be connected to second channel 414 through connecting channel 510. Connecting channel 510 may be narrower than both hollow portion 508 and second channel 414. As depicted, connecting channel 510 may have diameter 511.

Elongate member 500 may have plug portion 512 with diameter 513. Diameter 513 may be substantially equal to diameter 511, or just slightly smaller than diameter 511 such that plug portion 512 may form a tight fit with connecting channel 510 when plug portion 512 is moved into connecting channel 510. In some cases, diameter 513 may be sized such that plug portion 512 may form an interference fit with connecting channel 510 when plug portion 512 is moved into connecting channel 510.

In this illustrative example, elongate member 500 may be in open position 514. In particular, elongate member 500 may have been moved in the direction of arrow 516 into open position 514. In open position 514, plug portion 512 of elongate member 500 may be located outside of connecting channel 510.

Consequently, fluid may be allowed to flow from first channel 412, into hollow portion 508, through connecting channel 510, and into second channel 414. In particular, the fluid may flow around plug portion 512 within second channel 414 because diameter 513 of plug portion 512 may be smaller than the diameter of second channel 414. This fluid may then exit second channel 414 and be dispensed through nozzle 404.

From open position 514, elongate member 500 may be moved in the direction of arrow 518 into a closed position (not shown). In this closed position, plug portion 512 may be located within connecting channel 510. Elongate member 500 may be shown in a closed position in FIG. 6 below.

Figure 6:
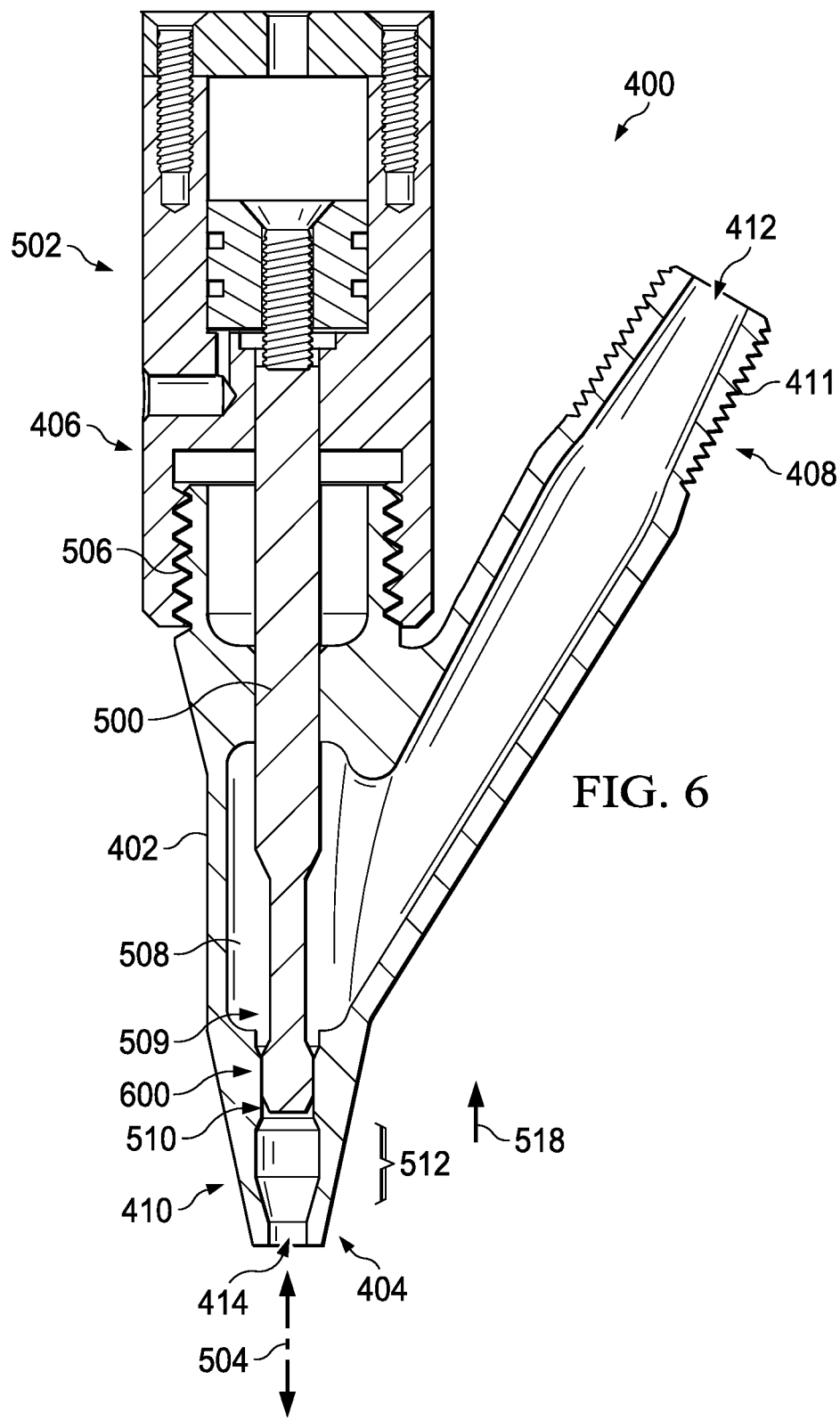
FIG. 6 is an illustration of a cross-sectional view of a control valve with an elongate member in a closed position in accordance with an illustrative embodiment.

With reference now to FIG. 6, an illustration of the cross-sectional view of control valve 400 from FIG. 5 with elongate member 500 in a closed position is depicted in accordance with an illustrative embodiment. In FIG. 6, the cross-sectional view of control valve 400 in FIG. 5 is depicted with elongate member 500 in closed position 600.

In particular, elongate member 500 has been moved in the direction of arrow 518 such that plug portion 512 is positioned within connecting channel 510. In this manner, plug portion 512 may be pulled upwards in the direction of arrow 518 towards piston device 502 to plug connecting channel 510.

By plugging connecting channel 510, plug portion 512 of elongate member 500 may prevent fluid from entering second channel 414. Further, when plug portion 512 is pulled towards piston device 502 such that plug portion 512 plugs connecting channel 510, negative pressure may be created within second channel 414. This negative pressure may prevent any fluid from flowing out of second channel 414. In particular, the negative pressure may cause leftover fluid within second channel 414 to be sucked back into second channel 414 in the direction of arrow 518 when plug portion 512 plugs connecting channel 510. In this manner, control valve 400 may be referred to as a "snuff-back" valve.

Figure 7:
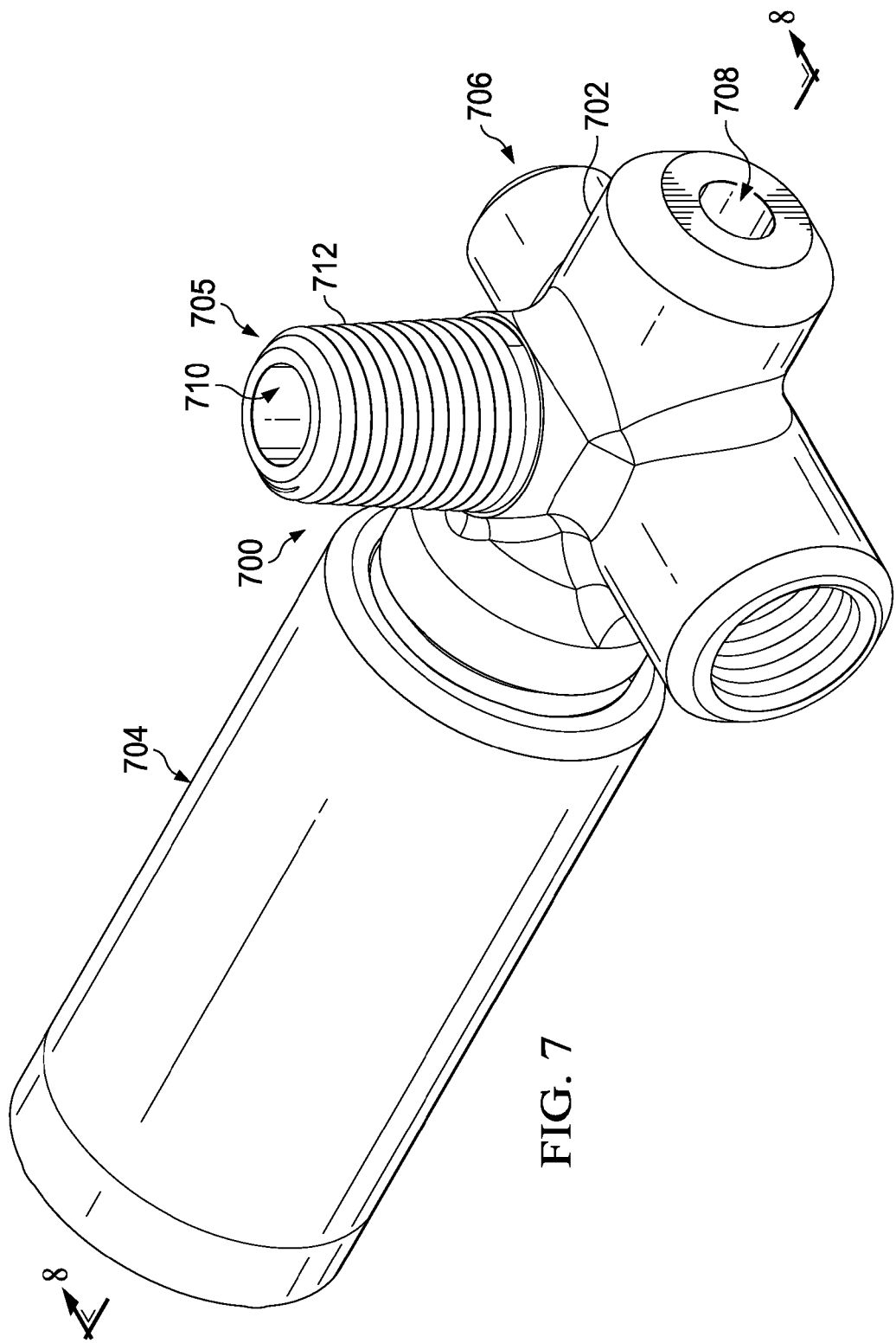
FIG. 7 is another illustration of an isometric view of a control valve in accordance with an illustrative embodiment.

With reference now to FIG. 7, another illustration of an isometric view of a control valve is depicted in accordance with an illustrative embodiment. In this illustrative example, control valve 700 may be an example of one implementation for control valve 106 in FIG. 1. As depicted, control valve 700 may include valve body 702 and actuation device 704. Valve body 702 and actuation device 704 may be examples of implementations for valve body 126 and actuation device 128, respectively in FIG. 1.

Valve body 702 may include first element 705, second element 706, and vent 708. First element 705 and second element 706 may be examples of implementations for first element 134 and second element 136, respectively, from FIG. 1. In this illustrative example, first element 705 and second element 706 take the form of protrusions that extend from valve body 702. Second element 706 may not form a nozzle in this illustrative example.

As depicted, first element 705 may have first channel 710 and second element 706 may have a second channel (not shown in this view). In this illustrative example, first element 705 may have threads 712 configured to engage corresponding threads (not shown) on a fluid source (not shown) for use in attaching valve body 702 to the fluid source.

Figure 8:
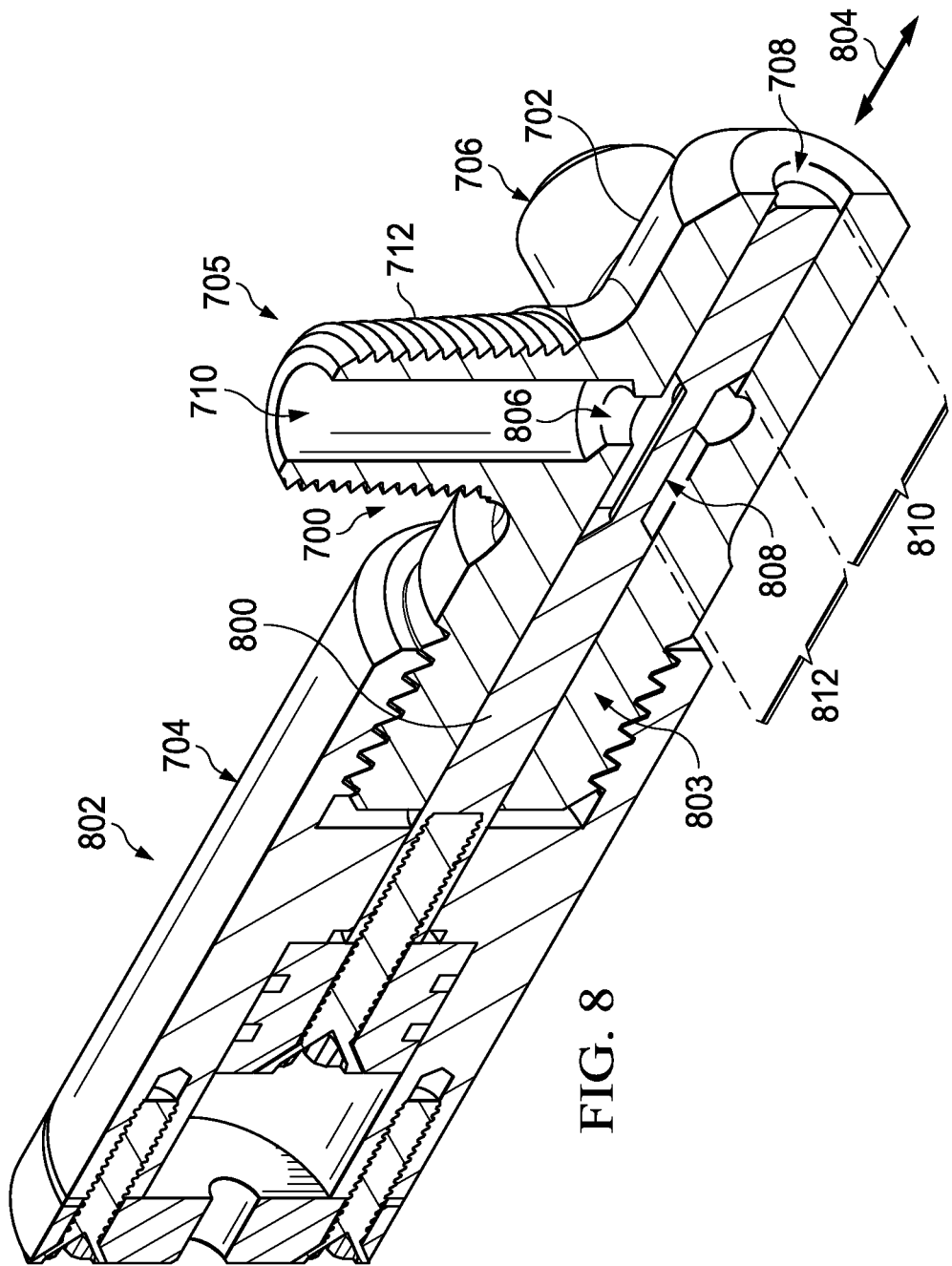
FIG. 8 is an illustration of a cross-sectional view of a control valve in accordance with an illustrative embodiment.

With reference now to FIG. 8, an illustration of a cross-sectional view of control valve 700 from FIG. 7 is depicted in accordance with an illustrative embodiment. In this illustrative example, a cross-sectional view of control valve 700 from FIG. 7 is depicted taken along lines 8-8 from FIG. 7.

As depicted, control valve 700 may include elongate member 800. Elongate member 800 may be an example of one implementation for elongate member 130 in FIG. 1. Elongate member 800 may be associated with actuation device 704. In this illustrative example, actuation device 704 may take the form of piston device 802. Further, valve body 702 may have attachment element 803 configured for attaching valve body 702 to piston device 802. Piston device 802 may be configured to move elongate member 800 linearly in a direction along axis 804.

As depicted, second element 706 may have second channel 806. Valve body 702 may have hollow portion 808. Hollow portion 808 of valve body 702 may connect first channel 710 within first element 705 to second channel 806 within second element 706.

Elongate member 800 may have plug portion 810 and narrow portion 812. When narrow portion 812 is located in front of second channel 806, fluid may be allowed to flow around narrow portion 812 and into second channel 806. However, elongate member 800 may be moved such that plug portion 810 is positioned in front of second channel 806. Plug portion 810 may be sized such that fluid may be stopped from flowing into second channel 806.

Figure 9:
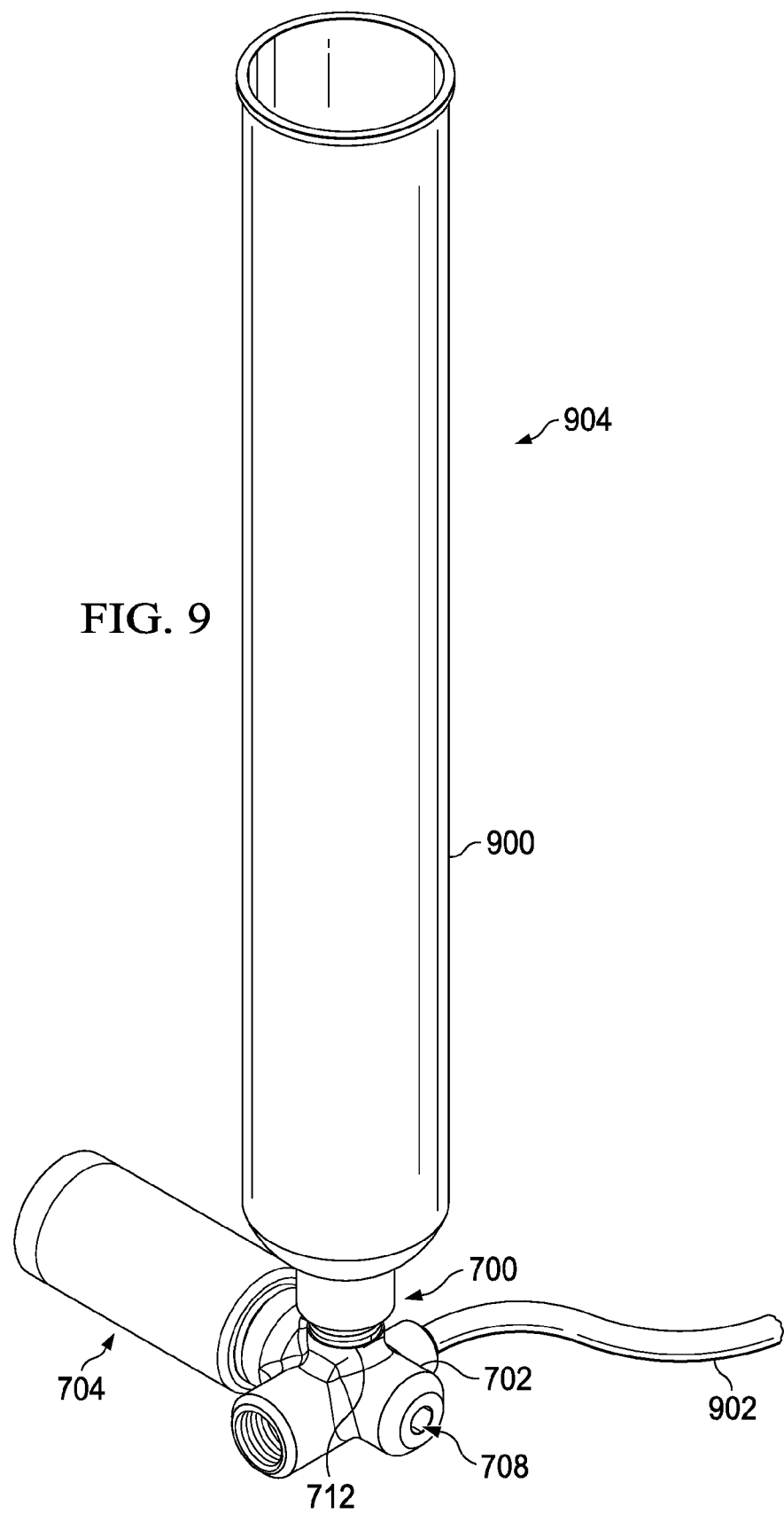
FIG. 9 is an illustration of an isometric view of a fluid dispensing system in accordance with an illustrative embodiment.

With reference now to FIG. 9, an illustration of an isometric view of a fluid dispensing system is depicted in accordance with an illustrative embodiment. In this illustrative example, fluid source 900 has been attached to valve body 702 of control valve 700 from FIG. 7. Further, hose 902 has been attached to valve body 702.

Together, control valve 700, fluid source 900, and hose 902 may form fluid dispensing system 904. Fluid dispensing system 904 may be an example of one implementation for fluid dispensing system 102 in FIG. 1. In this illustrative example, fluid dispensing system 102 may also include a nozzle (not shown) attached to hose 902. Fluid within fluid source 900 may be allowed to flow through control valve 700, through hose 902, and then dispensed through this nozzle. Control valve 700 may be used to determine whether fluid flows into hose 902 or not.

Figure 10:
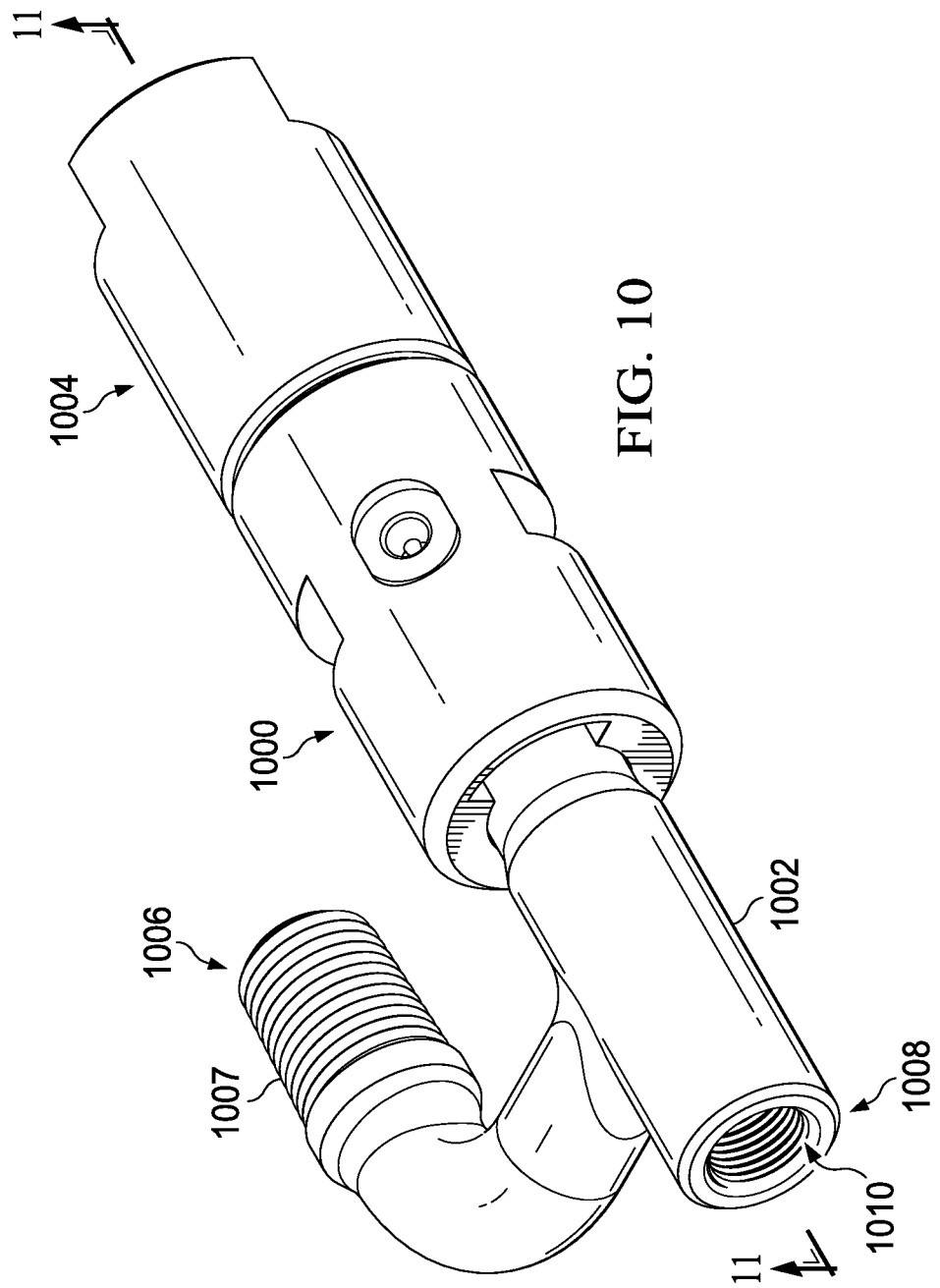
FIG. 10 is another illustration of an isometric view of a control valve in accordance with an illustrative embodiment.

With reference now to FIG. 10, another illustration of an isometric view of a control valve is depicted in accordance with an illustrative embodiment. In this illustrative example, control valve 1000 may include valve body 1002 and actuation device 1004. Valve body 1002 and actuation device 1004 may be examples of implementations for valve body 126 and actuation device 128, respectively, in FIG. 1.

Valve body 1002 may include first element 1006 and second element 1008. First element 1006 and second element 1008 may be examples of implementations for first element 134 and second element 136, respectively, from FIG. 1. First element 1006 may have threads 1007 that allow first element 1006 to be attached to a fluid source (not shown). Fluid may flow from this fluid source into valve body 1002 through first element 1006. Fluid may flow out of valve body 1002 through channel 1010 within second element 1008.

Figure 11:
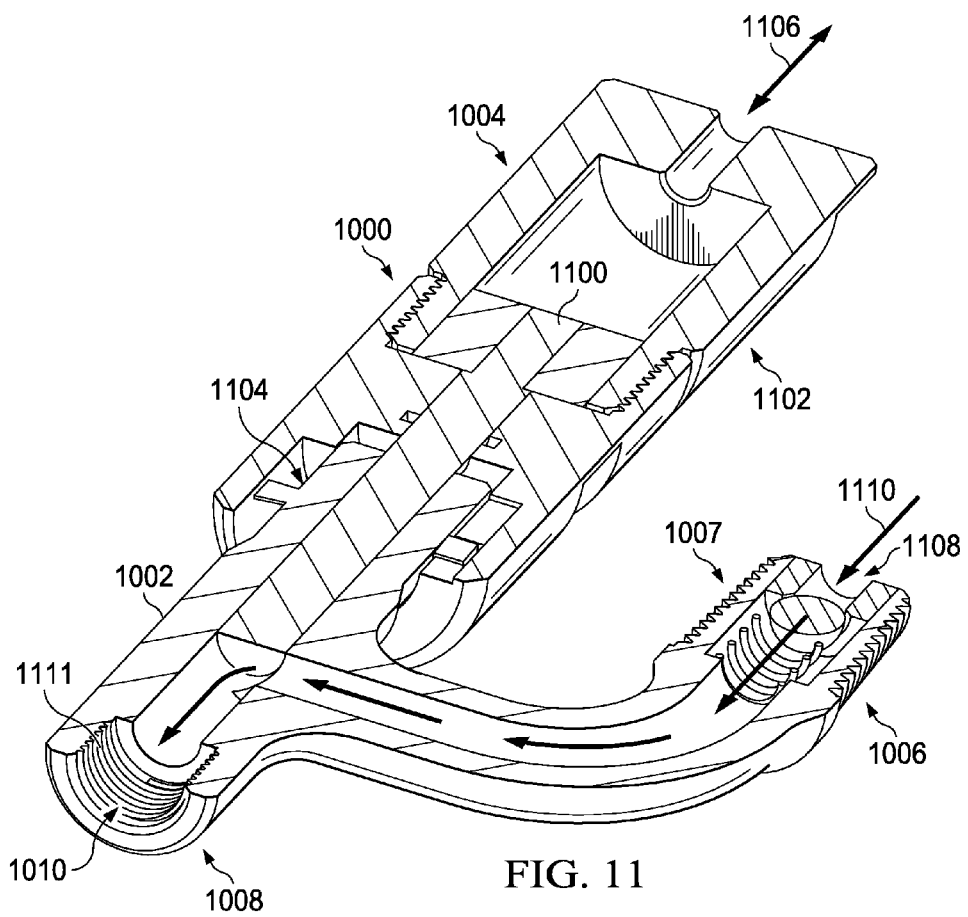
FIG. 11 is an illustration of a cross-sectional view of a control valve in accordance with an illustrative embodiment.

With reference now to FIG. 11, an illustration of a cross-sectional view of control valve 1000 from FIG. 10 is depicted in accordance with an illustrative embodiment. In this illustrative example, a cross-sectional view of control valve 1000 from FIG. 10 is depicted taken along lines 11-11 from FIG. 10.

As depicted, control valve 1000 may include elongate member 1100. Elongate member 1100 may be an example of one implementation for elongate member 130 in FIG. 1. Elongate member 1100 may be associated with actuation device 1004. In this illustrative example, actuation device 1004 may take the form of piston device 1102.

Further, valve body 1002 may have attachment element 1104 configured for attaching valve body 1002 to piston device 1102. Piston device 1102 may be configured to move elongate member 1100 linearly in a direction along axis 1106.

As depicted, first element 1006 may have channel 1108. Channel 1108 within first element 1006 may be configured to open directly into channel 1010 within second element 1008. In this manner, fluid may be allowed to flow in the direction of arrow 1110. Elongate member 1100 may be moved in a direction along axis 1106 to either allow fluid to flow from channel 1108 into channel 1010 or stop fluid from flowing from channel 1108 into channel 1010.

In this illustrative example, second element 1008 may have threads 1111 configured to engage corresponding threads (not shown) on a fluid transfer element (not shown). The fluid transfer element may be, for example, a hose having a fitting with threads configured to engage threads 1111.

Control valve 1000 may also be referred to as a "spitting" valve in some cases. Control valve 1000 may be used to "spit out" fluid. In particular, elongate member 1100 may be moved from an open position that allows fluid to flow into channel 1010 to a closed position that stops fluid from flowing into channel 1010 periodically such that fluid flows out of valve body 1002 in spurts.

The illustrations of control valve 200 in FIGS. 2-3, control valve 400 in FIGS. 4-6, control valve 700 in FIGS. 7-8, fluid dispensing system 904 in FIG. 9, and control valve 1000 in FIGS. 10-11 are not meant to imply physical or architectural limitations to the manner in which an illustrative embodiment may be implemented. Other components in addition to or in place of the ones illustrated may be used. Some components may be optional.

The different components shown in FIGS. 2-11 may be illustrative examples of how components shown in block form in FIG. 1 can be implemented as physical structures. Additionally, some of the components in FIGS. 2-11 may be combined with components in FIG. 1, used with components in FIG. 1, or a combination of the two.

Figure 12:
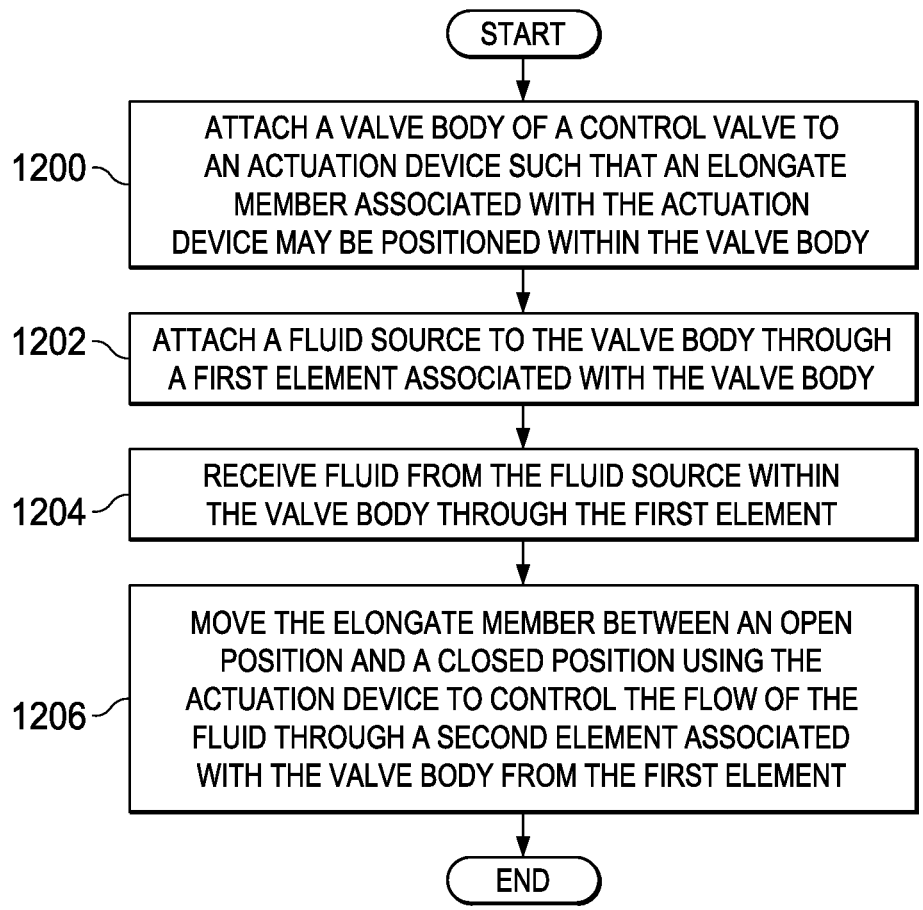
FIG. 12 is an illustration of a process for controlling a flow of fluid through a valve in the form of a flowchart in accordance with an illustrative embodiment.

With reference now to FIG. 12, an illustration of a process for controlling a flow of fluid through a valve is depicted in the form of a flowchart in accordance with an illustrative embodiment. The process illustrated in FIG. 12 may be implemented using control valve 106 in FIG. 1.

The process may begin by attaching valve body 102 of control valve 106 to actuation device 128 such that elongate member 130 associated with actuation device 128 may be positioned within valve body 126 (operation 1200). In particular, operation 1200 may be performed such that elongate member 130 may extend into a hollow portion of valve body 126.

Next, fluid source 104 may be attached to valve body 126 through first element 134 associated with valve body 126 (operation 1202). Fluid 110 from fluid source 104 may then be received within valve body 126 through first element 134 (operation 1204).

Thereafter, elongate member 130 may be moved between open position 144 and closed position 146 using actuation device 128 to control the flow of fluid 110 through second element 136 associated with valve body 126 from first element 134 (operation 1206), with the process terminating thereafter. Operation 1206 may be performed by moving elongate member 130 from closed position 146 to open position 144 and/or from open position 144 to closed position 146 any number of times to control the flow of fluid 110 out of valve body 126 through second element 136.

Figure 13:
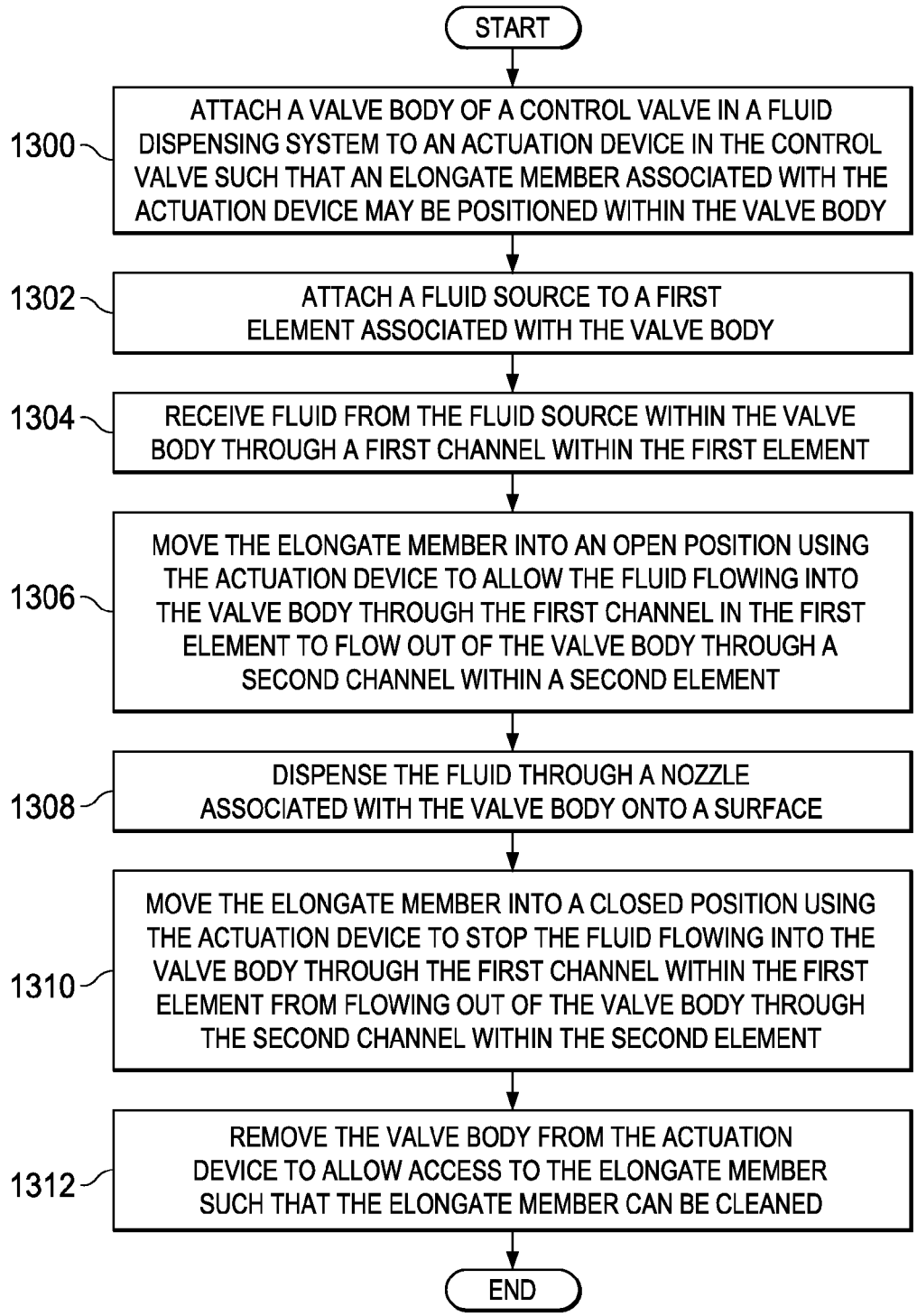
FIG. 13 is an illustration of a method for dispensing fluid onto a surface in the form of a flowchart in accordance with an illustrative embodiment.

With reference now to FIG. 13, an illustration of a method for dispensing fluid onto a surface is depicted in the form of a flowchart in accordance with an illustrative embodiment. The process illustrated in FIG. 13 may be implemented using fluid dispensing system 102 in FIG. 1.

The process may begin by attaching valve body 126 of control valve 106 in fluid dispensing system 102 to actuation device 128 in control valve 106 such that elongate member 130 associated with actuation device 128 may be positioned within valve body 126 (operation 1300). Next, fluid source 104 may be attached to first element 134 associated with valve body 126 (operation 1302).

Fluid 110 from fluid source 104 may be received within valve body 126 through first channel 140 within first element 134 (operation 1304). Thereafter, elongate member 130 may be moved into open position 144 using actuation device 128 to allow fluid 110 flowing into valve body 126 through first channel 140 in first element 134 to flow out of valve body 126 through second channel 142 within second element 136 (operation 1306).

Fluid 110 may be dispensed through nozzle 108 associated with valve body 126 onto surface 152 (operation 1308). In this illustrative example, at least a portion of second element 136 may form nozzle 108 associated with valve body 126. Once dispensing operations have been completed, elongate member 130 may be moved into closed position 146 using actuation device 128 to stop fluid 110 flowing into valve body 126 through first channel 140 within first element 134 from flowing out of valve body 126 through second channel 142 within second element 136 (operation 1310).

Thereafter, valve body 126 may be removed from actuation device 128 to allow access to elongate member 130 such that elongate member 130 can be cleaned (operation 1312), with the process terminating thereafter. In particular, removing valve body 126 may allow the wetted portion of elongate member 130, wetted by fluid 110, to be cleaned. Valve body 126 may then be discarded. In this manner, valve body 126 may take the form of disposable valve body 132.

Further, in some cases, after operation 1310 has been performed, the sequence of performing operations 1306, 1308, and 1310 may be repeated any number of times prior to performing operation 1312. In some illustrative examples, these operations may be performed such that fluid 110 may be deposited along surface 152 according to some selected patterns.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a flowchart in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In particular, fluid dispensing system 102 from FIG. 1 may be used for dispensing, for example, without limitation, sealant 122, over various surfaces during any one of the stages of aircraft manufacturing and service method 1400. For example, without limitation, fluid dispensing system 102 from FIG. 1 may be used for sealing fastener elements installed for aircraft 1500 during at least one of component and subassembly manufacturing 1406, system integration 1408, routine maintenance and service 1414, or some other stage of aircraft manufacturing and service method 1400.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an elongate member;
   an actuation device that moves the elongate member, which is associated with the actuation device, away from the actuation device to an open position and toward from the actuation device to a closed position; and
   a valve body attached to the actuation device such that the elongate member is positioned within the valve body in which fluid that flows into the valve body from a fluid source flows out of the valve body when the elongate member is in the open position; the elongate member, positioned within the valve body, comprising a plug portion at one end of the elongate member, and associated with the actuation device such that the actuation device moves the elongate member linearly in a direction along an axis between the open position and the closed position; and the valve body comprising: a hollow portion; a connecting channel connected to the hollow portion and comprising a first diameter, the first diameter being constant; a second channel, connected at one end to the connecting channel and open at a second end, and comprising a diameter that expands from the first diameter to a second diameter, the second diameter being constant, and narrows from the second diameter to a third diameter, the third diameter being constant, such that the plug portion forms an interference fit with the connecting channel when the elongate member is in the closed position, the connecting channel being narrower than both the hollow portion and the second channel.

2. The apparatus of claim 1, further comprising the valve body being disposable and wherein removing the valve body from the actuation device allows access to the elongate member such that the elongate member can be cleaned.

3. The apparatus of claim 1 further comprising:
   a first element associated with the valve body that attaches to the fluid source, wherein the fluid flows into the valve body from the fluid source through the first element; and a second element associated with the valve body in which the fluid flows out of the valve body through the second element when the elongate member is in the open position.

4. The apparatus of claim 3, wherein the first element is a first protrusion extending from the valve body comprising a first channel through which the fluid flows.

5. The apparatus of claim 3, wherein the second element is a second protrusion extending from the valve body comprising the second channel through which the fluid flows.

6. The apparatus of claim 3, wherein at least a portion of the second element forms a nozzle through which the fluid is dispensed onto a surface.

7. The apparatus of claim 1, wherein moving the elongate member in the direction towards the actuation device creates a negative pressure within the second element that prevents the fluid from flowing out of the second channel.

8. The apparatus of claim 3, wherein the first element comprises a first channel and the second element comprises the second channel and wherein the fluid is allowed to flow into the second channel from the first channel when the elongate member is in the open position and prevented from flowing into the second channel from the first channel when the elongate member is in the closed position.

9. The apparatus of claim 1, wherein the fluid comprises a viscosity within a selected range.

10. The apparatus of claim 9, wherein the fluid comprising the viscosity within the selected range is a sealant.

11. The apparatus of claim 1 further comprising:
the fluid source.

12. The apparatus of claim 1 further comprising:
a nozzle associated with the valve body in which the fluid is dispensed through the nozzle onto a surface.

13. The apparatus of claim 12 further comprising:
a number of fluid transfer elements configured to connect the nozzle to the valve body.

14. A fluid dispensing system comprising:
a fluid source holding fluid comprising a viscosity within a selected range;
an elongate member, positioned within a valve body, comprising a plug portion at one end of the elongate member;
an actuation device that moves the elongate member, which is associated with the actuation device, linearly in a direction along an axis away from the actuation device to an open position and toward the actuation device to a closed position;
a disposable valve body that attaches to the actuation device such that the elongate member is positioned within the disposable valve body;
a first element associated with the disposable valve body attached to the fluid source; and
a second element associated with the disposable valve body in which the fluid flows from the fluid source into the disposable valve body through the first element and out of the disposable valve body through the second element when the elongate member is in the open position and in which removing the disposable valve body allows access to the elongate member such that the elongate member can be cleaned; the disposable valve body comprising: a hollow portion; a connecting channel connected to the hollow portion and comprising a first diameter, the first diameter being constant; a second channel, connected at one end to the connecting channel and open at a second end, and comprising a diameter that expands from the first diameter to a second diameter, the second diameter being constant, and narrows from the second diameter to a third diameter, the third diameter being constant, such that the plug portion forms an interference fit with the connecting channel when the elongate member is in the closed position, the connecting channel being narrower than both the hollow portion and the second channel.

15. A method for controlling a flow of fluid through a valve, the method comprising:
receiving the fluid from a fluid source within a valve body of the valve; and
moving an elongate member, comprising a plug portion and positioned within the valve body, away from an actuator device to an open position and toward the actuator device to a closed position, the actuation device associated with the elongate member such that the actuation device, via the elongate member, controls the flow of the fluid out of the valve body; attaching the valve body to the actuation device such that the elongate member associated with the actuation device is positioned within the valve body, the valve body comprising: a hollow portion; a connecting channel connected to the hollow portion and comprising a first diameter, the first diameter being constant; a second channel, connected at one end to the connecting channel and open at a second end, and comprising a diameter that expands from the first diameter to a second diameter, the second diameter being constant, and narrows from the second diameter to a third diameter, the third diameter being constant, such that the plug portion forms an interference fit with the connecting channel when the elongate member is in the closed position, the connecting channel being narrower than both the hollow portion and the second channel.

16. The method of claim 15, wherein moving the elongate member between the open position and the closed position comprises:
moving the elongate member into the open position using the actuation device to allow the fluid flowing into the valve body through a first element associated with the valve body to flow out of the valve body through a second element associated with the valve body.

17. The method of claim 15, wherein moving the elongate member between the open position and the closed position comprises:
moving the elongate member into the closed position using the actuation device to stop the fluid flowing into the valve body through a first element associated with the valve body from flowing out of the valve body through a second element associated with the valve body.

18. The method of claim 17, wherein moving the elongate member into the closed position using the actuation device to stop the fluid flowing into the valve body through the first element associated with the valve body from flowing out of the valve body through the second element associated with the valve body comprises:
moving the elongate member in a direction towards the actuation device to move the elongate member into the closed position, wherein moving the elongate member in the direction towards the actuation device creates a negative pressure within the second element that stops the fluid from flowing out of the second element.

19. The method of claim 15 further comprising:
removing the valve body from the actuation device to allow access to the elongate member; and
attaching a different valve body to the actuation device.

20. The method of claim 15 further comprising:
attaching the valve body to a nozzle using a number of fluid transfer elements in which the nozzle is used to dispense the fluid onto a surface.

21. The method of claim 15 further comprising:
dispensing the fluid through a nozzle associated with the valve body onto a surface, wherein the nozzle is formed by at least a portion of the valve body.

22. A method for dispensing fluid onto a surface, the method comprising:
attaching a valve body to an actuation device;
positioning an elongate member comprising a plug portion and associated with the actuation device within the valve body, the valve body comprising:
- a hollow portion;
- a connecting channel connected to the hollow portion and comprising a first diameter, the first diameter being constant;
- a second channel, connected at one end to the connecting channel and open at a second end, and comprising a diameter that expands from the first diameter to a second diameter, the second diameter being constant, and narrows from the second diameter to a third diameter, the third diameter being constant, such that the plug portion forms an interference fit with the connecting channel when the elongate member is in a closed position the connecting channel being narrower than both the hollow portion and the second channel;

attaching a fluid source to a first element associated with the valve body;
receiving the fluid from the fluid source within the valve body through the first element;
moving the elongate member away from the actuation device into an open position allowing the fluid flowing into the valve body through the first element to flow out of the valve body through a second element;
dispensing the fluid through a nozzle associated with the valve body onto the surface, in which the nozzle is formed by at least a portion of the second element associated with the valve body;
moving the elongate member toward the actuation device into the closed position and stopping the fluid flowing into the valve body through the first element from flowing out of the valve body through the second channel;
removing the valve body from the actuation device to allow access to the elongate member; and
attaching a different valve body to the actuation device.

* * * * *